United States Patent
Yin et al.

(10) Patent No.: US 9,964,801 B2
(45) Date of Patent: May 8, 2018

(54) DISPLAY SUBSTRATE, MANUFACTURING METHOD THEREOF AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Bingkun Yin, Beijing (CN); Junhao Han, Beijing (CN); Wenlong Wang, Beijing (CN); Binbin Cao, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 0 days. days.

(21) Appl. No.: 15/096,371

(22) Filed: Apr. 12, 2016

(65) Prior Publication Data
US 2016/0313604 A1    Oct. 27, 2016

(30) Foreign Application Priority Data

Apr. 21, 2015    (CN) .......................... 2015 1 0191968

(51) Int. Cl.
*G02F 1/136*    (2006.01)
*G02F 1/1335*    (2006.01)
(Continued)

(52) U.S. Cl.
CPC .. *G02F 1/133555* (2013.01); *G02F 1/133371* (2013.01); *G02F 1/136227* (2013.01); *G02F 2201/50* (2013.01)

(58) Field of Classification Search
CPC ......... G02F 1/133555; G02F 1/133371; G02F 1/136227
(Continued)

(56) References Cited

U.S. PATENT DOCUMENTS 6,281,952 B1* 8/2001 Okamoto .......... G02F 1/133514
                                                349/106
2002/0180673 A1* 12/2002 Tsuda ................ G02F 1/136213
                                                345/87

(Continued)

FOREIGN PATENT DOCUMENTS

CN    1495481 A    5/2004
CN    1540413 A    10/2004
(Continued)

OTHER PUBLICATIONS

First Office Action dated May 3, 2017 in corresponding Chinese Patent Application No. 201510191968.1.

*Primary Examiner* — Lucy Chien
(74) *Attorney, Agent, or Firm* — Nath, Goldberg & Meyer; Joshua B. Goldberg

(57) ABSTRACT

The present invention provides a display substrate comprising a plurality of pixel regions and a thin film transistor provided in each of the pixel regions. Each of the pixel regions comprises a transmissive region and a reflective region, and a protection layer is provided on the thin film transistor. A portion of the protection layer corresponding to the reflective region is a protrusion portion, and a portion of the protection layer corresponding to the thin film transistor is provided with a via therein.

10 Claims, 2 Drawing Sheets

(51) Int. Cl.
*G02F 1/1333* (2006.01)
*G02F 1/1362* (2006.01)

(58) Field of Classification Search
USPC .......................................................... 349/43
See application file for complete search history.

(56) References Cited

U.S. PATENT DOCUMENTS

| | | | | |
|---|---|---|---|---|
| 2003/0030768 A1* | 2/2003 | Sakamoto | ......... | G02F 1/133555 349/113 |
| 2004/0075793 A1 | 4/2004 | Itoh et al. | | |
| 2004/0212765 A1 | 10/2004 | Kano et al. | | |
| 2005/0264731 A1 | 12/2005 | Itou et al. | | |
| 2008/0316402 A1* | 12/2008 | Fan Jiang | ......... | G02F 1/133555 349/114 |
| 2009/0051859 A1* | 2/2009 | Sugiyama | ......... | G02F 1/133512 349/106 |

FOREIGN PATENT DOCUMENTS

| | | |
|---|---|---|
| CN | 1928661 A | 3/2007 |
| CN | 1940665 A | 4/2007 |

\* cited by examiner

DISPLAY SUBSTRATE, MANUFACTURING METHOD THEREOF AND DISPLAY DEVICE

CROSS-REFERENCE TO RELATED APPLICATIONS

The present application claims the priority of Chinese Patent Application No. 201510191968.1, filed on Apr. 21, 2015, the contents of which are incorporated herein in their entirety by reference.

FIELD OF THE INVENTION

The present invention relates to the field of display technology, and in particular, relates to a display substrate, a manufacturing method of the display substrate, and a display device.

BACKGROUND OF THE INVENTION

Nowadays, liquid crystal displays (LCDs) have become mainstream products on the market due to their excellent performances and mature technologies. The liquid crystal displays may be classified into transmissive liquid crystal displays, reflective liquid crystal displays and transflective liquid crystal displays according to the type of light source thereof. Among the liquid crystal displays, the transflective liquid crystal display has been widely used in portable mobile electronic devices because it combines the advantages of the reflective liquid crystal display and the transmissive liquid crystal display and thus is suitable for both indoor use and outdoor use.

In a transflective liquid crystal display in the prior art, in one aspect, a light transmittance and a light reflectance thereof restrain each other, i.e., the light reflectance is low if the light transmittance is high, and the light transmittance is low if the light reflectance is high; in another aspect, the display contrast in a reflective mode is decreased due to a difference between an optical path of reflected light and an optical path of transmitted light; in yet another aspect, a transflective liquid crystal display in the prior art is formed by an aligning and assembling process, and thus the manufacturing process thereof is complicated and there is a defect of light leakage due to an error in the aligning and assembling process.

SUMMARY OF THE INVENTION

In view of the above disadvantages existing in the prior art, an object of the present invention is to provide a display substrate, a manufacturing method of the display substrate and a display device including the display substrate. The display substrate can avoid light leakage effectively, and have good color uniformity and good display brightness.

Some embodiments of the present invention provide a display substrate including a plurality of pixel regions and a thin film transistor provided in each of the pixel regions, each of the pixel regions includes a transmissive region and a reflective region, wherein, a protection layer is provided on the thin film transistor, a portion of the protection layer corresponding to the reflective region is a protrusion portion, and a portion of the protection layer corresponding to the thin film transistor is provided with a via therein.

Optionally, a color resist layer is provided above the protrusion portion and extends to the transmissive region, and a thickness of a portion of the color resist layer corresponding to the transmissive region is twice as large as that of a portion of the color resist layer corresponding to the reflective region.

Optionally, a reflecting layer is provided between the protrusion portion and a portion of the color resist layer corresponding to the protrusion portion.

Optionally, a pixel-electrode layer is provided on the color resist layer, and is electrically connected to a drain of the thin film transistor through the via provided in the protection layer.

Optionally, the protection layer is made of silicon nitride or silicon oxide.

Optionally, every four pixel regions of the display substrate form a pixel unit, the pixel unit includes a red sub-pixel, a green sub-pixel, a blue sub-pixel and a white sub-pixel, the color resist layer in the red sub-pixel is red, the color resist layer in the green sub-pixel is green, and the color resist layer in the blue sub-pixel is blue.

Some embodiments of the present invention provide a manufacturing method of a display substrate, the display substrate includes a plurality of pixel regions and a thin film transistor provided in each of the pixel regions, each of the pixel regions includes a transmissive region and a reflective region, and the manufacturing method includes a step of:

forming a protection layer on the thin film transistor by a single patterning process, such that a portion of the protection layer corresponding to the reflective region is a protrusion portion, and a portion of the protection layer corresponding to the thin film transistor is provided with a via therein.

Optionally, the protection layer is formed by a multi-tone exposure process, such that in each of the pixel regions, a region corresponding to the protrusion portion is a light blocking region, a region corresponding to the via is a completely transmissive region, and the remaining region is a semi-transparent region.

Some embodiments of the present invention provide a display device including the display substrate as described above and a common electrode layer provided opposite to the display substrate.

Optionally, a distance between a surface of a portion of the color resist layer corresponding to the reflective region and a surface of the common electrode layer opposite thereto is one half of a distance between a surface of a portion of the color resist layer corresponding to the transmissive region and a surface of the common electrode layer opposite thereto.

The advantageous technical effects of the present invention are as follows.

The display substrate solves the problem of light leakage due to the error in a process for aligning and assembling a color-filter substrate and an array substrate in the prior art by using a COA structure, and solves the problem of nonuniformity in colors of a transmissive region and a reflective region of a transflective display panel in the prior art. Thus, the display contrast in a reflective mode is increased, and the transflective display panel of the present invention can realize uniform display not only in a case of backlight transmission and but also in a case of outdoor strong light reflection so as to realize good display both indoors and outdoors. Meanwhile, a four-color (RGBW) sub-pixel scheme is adopted in the display substrate to alleviate the disadvantage of low aperture ratio due to mutual constraint between a light transmittance and a light reflectance in a transflective display panel in the prior art, thereby increasing the aperture ratio of a transmissive region significantly. In addition, the display brightness of a pixel is increased to realize good display effect. Furthermore, power consumption is lowered, and costs in production and usage are decreased.

In the manufacturing method of a display substrate, the protrusion portion for ensuring that an optical path passing through the reflective region is equal to that passing through the transmissive region is formed, in the process of forming the protection layer on the thin film transistor, by using a COA structure, thereby simplifying process steps and obtaining a good display effect of the formed display substrate.

The display device has a good display effect.

REFERENCE NUMERALS

1—transmissive region, 2—reflective region, 10—substrate, 11—gate, 110—gate line, 12—gate insulating layer, 13—active layer, 14—drain, 140—data line, 15—source, 16—protection layer, 160—protrusion portion, 17—reflecting layer, 18—color resist layer, 19—pixel-electrode layer, 20—common electrode layer.

DETAILED DESCRIPTION OF THE EMBODIMENTS

To make those skilled in the art better understand the technical solutions of the present invention, a display substrate, a manufacturing method thereof, and a display device provided by the present invention will be described below in detail with reference to the accompanying drawings and the following embodiments.

Embodiment 1

The present embodiment provides a display substrate integrated with a colorized color resist layer. As compared with a method to align and assemble a color-filter substrate and an array substrate to form a display panel in the prior art, the present invention does not need an aligning and assembling process, thereby ensuring an accuracy of pixel alignment and avoiding light leakage due to the error in an aligning and assembling process. Furthermore, in the display substrate, a four-color (RGBW) pixel display scheme is adopted, which can ensure the display brightness of a pixel effectively.

Figure 1:
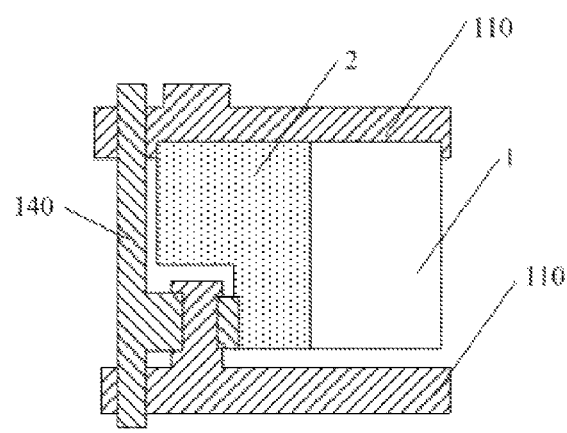
FIG. 1 is a schematic diagram of division of a transmissive region and a reflective region of a pixel region according to Embodiment 1 of the present invention.

Specifically, the display substrate includes a plurality of pixel regions and a thin film transistor provided in each of the pixel regions, e.g., a thin film transistor provided in a border zone of each of the pixel regions. As shown in FIG. 1, each of the pixel regions includes a transmissive region 1 and a reflective region 2. Also referring to FIG. 2, a protection layer 16 is provided on the thin film transistor. A portion of the protection layer 16 corresponding to the reflective region 2 is a protrusion portion 160, and a portion of the protection layer 16 corresponding to the thin film transistor is provided with a via therein. The via is used for electrically connecting a pixel-electrode layer 19 and a drain 14, which will be described below, together. With the protrusion portion 160, optical paths of light passing through the transmissive region 1 and the reflective region 2 of the display substrate match to each other. That is, since the protection layer 16 has the protrusion portion 160 in the reflective region 2, an optical path of light passing through the reflective region 2 is consistent with an optical path of light passing through the transmissive region 1. Thus, a difference between the brightness of the reflective region and the brightness of the transmissive region can be eliminated.

Figure 2:
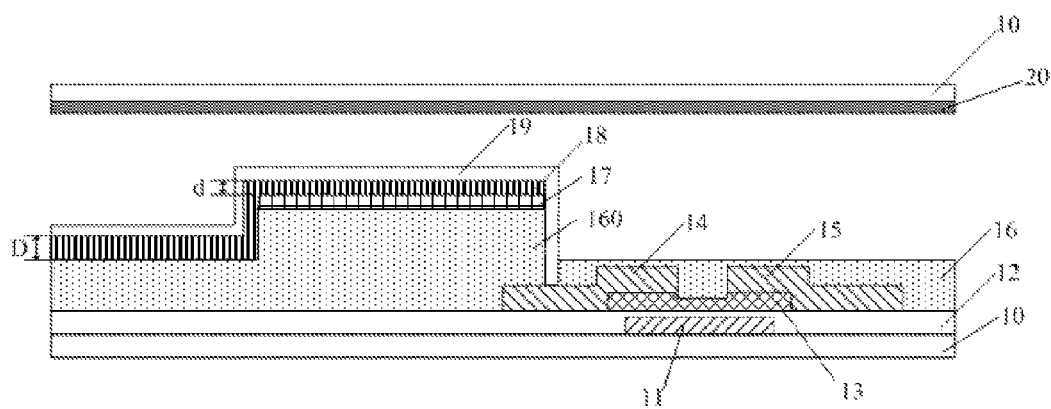
FIG. 2 is a schematic structure diagram of a pixel region of a display substrate according to Embodiment 1 of the present invention.

As shown in FIG. 2, in the transmissive region 1 and the reflective region 2, a color resist layer 18 is provided above the protection layer 16. A thickness D of a portion of the color resist layer 18 corresponding to the transmissive region 1 is twice as large as a thickness d of a portion of the color resist layer 18 corresponding to the reflective region 2, i.e., D=2d or d=D/2. It can be easily understood that, a reflecting layer 17 is provided between the protrusion portion 160 and a portion of the color resist layer 18 corresponding to the protrusion portion 160. The reflecting layer 17 may be made of a reflective metal which is a metal with high reflectance, such as silver, aluminum or chromium, and the present invention is not limited thereto.

Ambient light entering into the display substrate through the color resist layer 18 is reflected back into the color resist layer 18 by the reflecting layer 17, and the reflected light enters into the visual field of a viewer after passing through the color resist layer 18 again. Since the thickness D of the portion of the color resist layer 18 corresponding to the transmissive region 1 is twice as large as the thickness d of the portion of the color resist layer 18 corresponding to the reflective region 2, it is ensured that the transmissive region 1 and the reflective region 2 have the same chrominance.

Generally, a thin film transistor includes a gate, an active layer, a source and a drain. In the present embodiment, the via provided in the portion of the protection layer 16 corresponding to the thin film transistor corresponds to the position of a drain 14 of the thin film transistor. As shown in FIG. 2, a pixel-electrode layer 19 is provided on the color resist layer 18, and is electrically connected to the drain 14 of the thin film transistor through the via provided in the protection layer 16.

Optionally, the protection layer 16 is made of silicon nitride (SiNx) or silicon oxide (SiOx), and thus good insulating and cushioning effects can be obtained.

Figure 3:
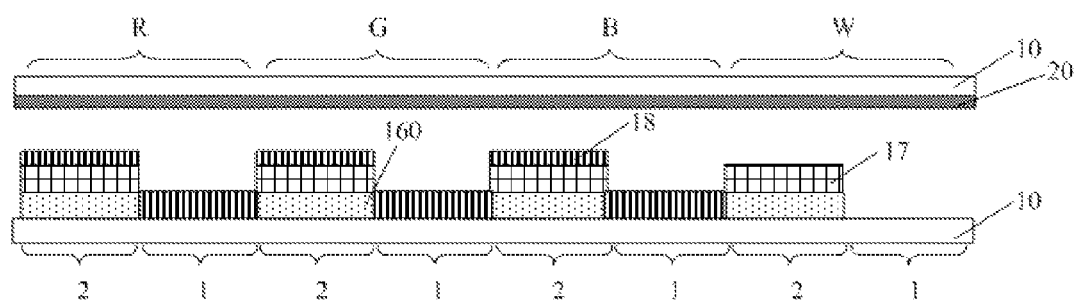
FIG. 3 is a schematic structure diagram of a pixel unit of the display substrate according to Embodiment 1 of the present invention.

In the present embodiment, as shown in FIG. 3, in order to further increase the display brightness of a pixel, every four pixel regions of the display substrate form a pixel unit, i.e., each pixel unit includes four pixel regions adjacent to each other. Each pixel unit includes a red sub-pixel R, a green sub-pixel G, a blue sub-pixel B and a white sub-pixel W. Here, a sub-pixel is the pixel region as described above. The color resist layer in the red sub-pixel R is red, and the color resist layer in the green sub-pixel G is green. The color resist layer in the blue sub-pixel B is blue, and there may be no color resist layer in the white sub-pixel W. That is, formation of a color resist layer in the white sub-pixel W may be omitted. With the white sub-pixel W, the brightness of an overall pixel unit may be compensated and adjusted effectively, which facilitates increasing the light transmittance of each pixel unit and decreasing an amount of light absorbed by the color resist layer, and further eliminates a difference between the brightness of the reflective region and the brightness of the transmissive region.

In the present embodiment, a portion of the protection layer 16 in the reflective region 2 is formed into the protrusion portion 160, which allows an optical path of light passing through the reflective region 2 to be consistent with an optical path of light passing through the transmissive region 1. The display substrate can be used for forming a liquid crystal display panel. As shown in FIGS. 2 and 3, the liquid crystal display panel includes the display substrate and a common electrode layer 20 which are arranged opposite to each other. Optionally, after the display substrate and the common electrode layer 20 are assembled to form the liquid crystal display panel, a distance between two opposite surfaces, i.e., a surface of a portion of the color resist layer 18 corresponding to the reflective region 2 and a surface of the common electrode layer 20 opposite thereto, is one half of a distance between two opposite surfaces, i.e., a surface of a portion of the color resist layer 18 corresponding to the transmissive region 1 and a surface of the common electrode layer 20 opposite thereto, so that a thickness of a portion of a liquid crystal layer corresponding to the reflective region 2 is one half of a thickness of a portion of the liquid crystal layer corresponding to the transmissive region 1. Thus, it is ensured that optical paths of light passing through the transmissive region 1 and the reflective region 2 of the liquid crystal display panel are equal to each other, the chromatic aberration of the transmissive region 1 and the reflective region 2 is small, and the colors of the transmissive region 1 and the reflective region 2 match to each other.

From the foregoing description, it can be seen that the display substrate according to the present embodiment is of COA (Color Filter On Array) structure and includes the reflective region capable of reflecting ambient light to realize reflective display and the transmissive region which allows light from a backlight to pass therethrough to realize transmissive display, thereby realizing transflective function, solving the problem of light leakage of due to the error in a process for aligning and assembling a color-filter substrate and an array substrate in the prior art, and solving the problem of nonuniformity in colors of a transmissive region and a reflective region of a transflective display panel in the prior art. Thus, the display contrast in a reflective mode is increased, and the transflective display panel of the present embodiment can realize uniform display not only in a case of backlight transmission and but also in a case of outdoor strong light reflection so as to realize good display both indoors and outdoors. Meanwhile, a four-color (RGBW) sub-pixel scheme is adopted in the display substrate to alleviate the disadvantage of low aperture ratio due to mutual restraint between a light transmittance and a light reflectance in a transflective display panel in the prior art, thereby increasing the aperture ratio of a transmissive region significantly. In addition, the display brightness of a pixel is increased to realize good display effect. Furthermore, power consumption is lowered, and costs in production and usage are decreased.

Embodiment 2

The present embodiment provides a manufacturing method of the display substrate according to Embodiment 1. The manufacturing method simplifies process steps of the display substrate by simultaneously forming the protection layer on the thin film transistor and the protrusion portion for ensuring that an optical path of light passing through the reflective region is equal to that passing through the transmissive region. Since in the manufacturing method, a transflective display substrate can be formed with fewer process steps, cost of production is decreased. The formed display substrate has a good display effect, and thus use-cost of the display substrate is decreased.

The display substrate includes a plurality of pixel regions and a thin film transistor provided in each of the pixel regions, e.g., a thin film transistor provided in a border zone of each of the pixel regions, and each of the pixel regions includes a transmissive region and a reflective region. The manufacturing method includes a step of: forming a protection layer on the thin film transistor by a single patterning process, such that a portion of the protection layer corresponding to the reflective region is a protrusion portion, and a portion of the protection layer corresponding to the thin film transistor is provided with a via therein. Thus, process steps thereof are simplified.

Optionally, the protection layer is formed by a multi-tone exposure process, such that in each of the pixel regions, a region corresponding to the protrusion portion 160 is a light blocking region, a region corresponding to the via is a completely transmissive region, and the remaining region is a semi-transparent region. The production cost may be decreased effectively by forming a variety of patterns with a single mask.

A complete process for manufacturing the display substrate will be described below with reference to FIG. 2. The manufacturing method of the display substrate includes the following steps S1 to S7 performed sequentially.

Step S1: depositing a gate metal layer on a substrate 10, and forming a pattern including a gate 11 and a gate line 110 by a patterning process (i.e., by an exposure process, a development process and an etching process, and the same is also applicable to the following steps).

Step S2: sequentially forming a gate insulating layer 12 and an active layer 13 on the pattern including the gate 11 and the gate line 110, and forming a pattern including the active layer 13 right above the gate 11 by a patterning process.

Step S3: depositing a source-drain metal layer on the pattern including the active layer 13, forming a pattern including a drain 14 (and a data line 140) and a source 15 on the active layer 13 by a patterning process, and forming a conducting channel between the drain 14 and the source 15 by a dry etching process.

Step S4: depositing the material of a protection layer, forming a protection layer 16 and forming a via for electrically connecting a pixel-electrode layer 19 to the drain 14 in the protection layer 16 by an etching process, such that a portion of the protection layer 16 corresponding to the thin film transistor is a back channel protective layer, and a portion of the protection layer 16 corresponding to the reflective region is the protrusion portion 160 which causes a level difference between the reflective region and the remaining region (in other words, a difference between a thickness of a portion of the protection layer 16 in the reflective region and a thickness of a portion of the protection layer 16 in the remaining region).

Step S5: depositing a reflective metal, and forming a pattern including a reflecting layer 17 by a patterning process, wherein the reflective metal is a metal with high reflectance, such as silver, aluminum or chromium, and the present invention is not limited thereto.

Step S6: depositing the material of a color resist layer, and forming a color resist layer 18 by performing a patterning process on the material of a color resist layer with a halftone mask, such that a thickness d of a portion of the color resist layer 18 corresponding to the reflective region 2 is one half of a thickness D of a portion of the color resist layer 18 corresponding to the transmissive region 1.

Step S7: depositing a transparent metal layer, and forming a pattern including a pixel-electrode layer 19 by a patterning process, such that the pixel-electrode layer 19 is electrically connected to the drain 14.

After the display substrate is formed, the display substrate and a substrate provided with a common electrode layer 20 are aligned and assembled to form a cell, and a liquid crystal layer is provided therebetween, thereby forming a liquid crystal display panel.

In the manufacturing method of the display substrate, the protrusion portion for ensuring that an optical path of light passing through the reflective region is equal to that passing through the transmissive region is formed, in the process of forming the protection layer on the thin film transistor, by using a COA structure, thereby simplifying process steps and obtaining a good display effect of the formed display substrate.

It should be understood that, the display substrate of the present invention does not include the common electrode layer 20 and the substrate 10 which are adjacent to each other as shown in FIGS. 2 and 3.

Embodiment 3

The present embodiment provides a display device including the display substrate according to Embodiment 1 and a common electrode layer 20 provided opposite to the display substrate. The common electrode layer 20 may be provided on another substrate 10 other than the substrate 10 of the display substrate. The display substrate and said another substrate 10 provided with the common electrode layer 20 are aligned and assembled to form the display device.

In the display device, a distance between two opposite surfaces, i.e., a surface of a portion of the color resist layer 18 corresponding to the reflective region 2 and a surface of the common electrode layer 20 opposite thereto, is one half of a distance between two opposite surfaces, i.e., a surface of a portion of the color resist layer 18 corresponding to the transmissive region 1 and a surface of the common electrode layer 20 opposite thereto, such so that a thickness of a portion of a liquid crystal layer corresponding to the reflective region 2 is one half of a thickness of a portion of the liquid crystal layer corresponding to the transmissive region 1. Thus, it is ensured that optical paths of light passing through the transmissive region 1 and the reflective region 2 of the display device are equal to each other, the chromatic aberration of the transmissive region 1 and the reflective region 2 is small, and the colors of the transmissive region 1 and the reflective region 2 match to each other.

The display device may be any product or component having a display function, such as a liquid crystal display panel, electronic paper, a mobile phone, a tablet computer, a television set, a display, a notebook computer, a digital photo frame, a navigator, and the like.

The display device has good color rendering and good brightness, and thus has a good display effect.

It should be understood that, the foregoing embodiments are only exemplary embodiments used for explaining the principle of the present invention, but the present invention is not limited thereto. Various variations and improvements may be made by a person skilled in the art without departing from the spirit and essence of the present invention, and these variations and improvements also fall into the protection scope of the present invention.

What is claimed is:

1. A display substrate, comprising a plurality of pixel regions and a thin film transistor provided in each of the pixel regions, wherein, each of the pixel regions comprises a transmissive region and a reflective region, a protection layer is provided on the thin film transistor, a portion of the protection layer corresponding to the reflective region is a protrusion portion, and a portion of the protection layer corresponding to the thin film transistor is provided with a via therein;

wherein the protrusion portion is configured to ensure that an optical path of light passing through the reflective region is equal to an optical path of light passing through the transmissive region;

wherein a color resist layer is provided above the protrusion portion and extends to the transmissive region, and a thickness of a portion of the color resist layer corresponding to the transmissive region is twice as large as that of a portion of the color resist layer corresponding to the reflective region; and wherein a pixel-electrode layer is provided on the color resist layer, and is electrically connected to a drain of the thin film transistor through the via provided in the protection layer.

2. The display substrate according to claim 1, wherein, a reflecting layer is provided between the protrusion portion and a portion of the color resist layer corresponding to the protrusion portion.

3. The display substrate according to claim 1, wherein, the protection layer is made of silicon nitride or silicon oxide.

4. The display substrate according to claim 2, wherein, the protection layer is made of silicon nitride or silicon oxide.

5. The display substrate according to claim 1, wherein, every four pixel regions of the display substrate form a pixel unit, the pixel unit comprises a red sub-pixel, a green sub-pixel, a blue sub-pixel and a white sub-pixel, the color resist layer in the red sub-pixel is red, the color resist layer in the green sub-pixel is green, and the color resist layer in the blue sub-pixel is blue.

6. The display substrate according to claim 2, wherein, every four pixel regions of the display substrate form a pixel unit, the pixel unit comprises a red sub-pixel, a green sub-pixel, a blue sub-pixel and a white sub-pixel, the color resist layer in the red sub-pixel is red, the color resist layer in the green sub-pixel is green, and the color resist layer in the blue sub-pixel is blue.

7. A manufacturing method of a display substrate, wherein the display substrate comprises a plurality of pixel regions and a thin film transistor provided in each of the pixel regions, each of the pixel regions comprises a transmissive region and a reflective region, and the manufacturing method comprises a step of:

forming a protection layer on the thin film transistor by a single patterning process, such that a portion of the protection layer corresponding to the reflective region is a protrusion portion, and a portion of the protection layer corresponding to the thin film transistor is provided with a via therein;

wherein the protrusion portion is configured to ensure that an optical path of light passing through the reflective region is equal to an optical path of light passing through the transmissive region;

the manufacturing method further comprises steps of:

providing a color resist layer above the protrusion portion, such that the color resist layer extends to the transmissive region, and a thickness of a portion of the color resist layer corresponding to the transmissive region is twice as large as that of a portion of the color resist layer corresponding to the reflective region; and providing a pixel-electrode layer on the color resist layer, such that the pixel-electrode layer is electrically connected to a drain of the thin film transistor through the via provided in the protection layer.

8. The manufacturing method according to claim 7, wherein, the protection layer is formed by a multi-tone exposure process, such that in each of the pixel regions, a region corresponding to the protrusion portion is a light blocking region, a region corresponding to the via is a completely transmissive region, and the remaining region is a semi-transparent region.

9. A display device, comprising the display substrate according to claim 1 and a common electrode layer provided opposite to the display substrate.

10. The display device according to claim 9, wherein, a distance between a surface of a portion of the color resist layer corresponding to the reflective region and a surface of the common electrode layer opposite thereto is one half of a distance between a surface of a portion of the color resist layer corresponding to the transmissive region and a surface of the common electrode layer opposite thereto.

* * * * *